(12) United States Patent
Poojary et al.

(10) Patent No.: US 11,066,813 B2
(45) Date of Patent: Jul. 20, 2021

(54) WATER MANAGEMENT, METERING, LEAK DETECTION, WATER ANALYTICS AND REMOTE SHUTOFF SYSTEM

(71) Applicant: SAYA LIFE, INC., Los Angeles, CA (US)

(72) Inventors: Sanjay Poojary, Irvine, CA (US); Yadvender Singh Kalsi, Corona, CA (US); Noorali Lakhani, Santa Monica, CA (US)

(73) Assignee: SAYA LIFE, INC., Los Angeles, CA (US)

( * ) Notice: Subject to any disclaimer, the term of this patent is extended or adjusted under 35 U.S.C. 154(b) by 257 days.

(21) Appl. No.: 15/898,003

(22) Filed: Feb. 15, 2018

(65) Prior Publication Data

US 2018/0230681 A1 Aug. 16, 2018

Related U.S. Application Data

(60) Provisional application No. 62/459,389, filed on Feb. 15, 2017.

(51) Int. Cl.
| | |
|---|---|
| *G01F 1/00* | (2006.01) |
| *G01F 7/00* | (2006.01) |
| *E03B 7/07* | (2006.01) |
| *G01F 15/075* | (2006.01) |
| *G01M 3/28* | (2006.01) |
| *G01F 25/00* | (2006.01) |
| *G01F 15/06* | (2006.01) |
| *G01F 15/18* | (2006.01) |

(52) U.S. Cl.
CPC .............. *E03B 7/071* (2013.01); *E03B 7/072* (2013.01); *E03B 7/078* (2013.01); *G01F 15/063* (2013.01); *G01F 15/0755* (2013.01); *G01F 25/0007* (2013.01); *G01M 3/2807* (2013.01); *G01F 15/185* (2013.01); *Y02A 20/00* (2018.01)

(58) Field of Classification Search
CPC ...... G01F 1/00; G01F 15/068; G01F 15/0755; G01F 25/0007; G01M 3/2807
USPC .......................................................... 702/45
See application file for complete search history.

(56) References Cited

U.S. PATENT DOCUMENTS

| | | | |
|---|---|---|---|
| 9,383,289 B1 | 7/2016 | Meyer | |
| 2015/0013772 A1* | 1/2015 | Patel | F16K 37/0075 137/1 |
| 2016/0163177 A1* | 6/2016 | Klicpera | G08B 21/18 137/59 |
| 2016/0261425 A1* | 9/2016 | Horton | H04L 12/2818 |
| 2016/0289929 A1* | 10/2016 | Guy | F17D 5/06 |
| 2016/0335875 A1* | 11/2016 | Alcorn | G01F 1/68 |
| 2017/0184417 A1* | 6/2017 | Pedreiro | G01D 4/002 |
| 2018/0128706 A1* | 5/2018 | Murakami | G01M 3/2807 |

* cited by examiner

*Primary Examiner* — Michael P Nghiem
(74) *Attorney, Agent, or Firm* — Nguyen Tarbet LLC

(57) ABSTRACT

A water management system effective for managing and metering water usage and detecting and reducing water leaks is described herein. The water management system can detect a leak when a volume of water flow or change in water pressure detected by a water meter of the system is uncharacteristic for a given day and time of day at the node. Upon detecting the leak, the system alerts the user, and in some situations, remotely shuts off a water supply to preemptively address a water leakage issue.

2 Claims, 8 Drawing Sheets

WATER MANAGEMENT, METERING, LEAK DETECTION, WATER ANALYTICS AND REMOTE SHUTOFF SYSTEM

CROSS REFERENCE

This application claims priority to U.S. Provisional Patent Application No. 62/459,389, filed Feb. 15, 2017, the specification(s) of which is/are incorporated herein in their entirety by reference.

FIELD OF THE INVENTION

The present invention relates to a water management system effective for managing and metering water usage, detecting and reducing water leaks, prevent pipes from freezing, detecting and maintaining water quality while allowing for remotely shutting off water supply during leaks to reduce damage and performing analytics to provide water usage information and leak reports to a user to aide in the conservation of water.

BACKGROUND OF THE INVENTION

Leaky pipes in home or office buildings may occur from any number of devices or pipes in the building. Even small leaks, if undetected, can lead to larger issues. Specifically, continuous and undetected water leaking may lead to structural damages, and/or result in increased mold and infestation, and/or also cause increased water utility bills. Pipes can freeze during low temperatures, causing them to burst. For example, during cold winter spells, water inside the pipes freezes and cause blockage in the pipes. As a result of the blockage, pressure inside the pipe starts to build up, and the increased pressure can cause the pipes to burst. Damage caused by burst water pipes are extensive and expensive. Consumers spend billions of dollars as a result of damages caused by water leaks and bursting pipes. Additionally, the average consumer is unaware of the amount of water they waste each day and are also concerned about the quality of water and would like to know what kind of contaminants are present in the water.

The present invention addresses all of the above issues by providing a system that monitors water usage while detecting and preventing water leaks and frozen pipes. Further, the present invention monitors the quality of water, alerts the user if the water quality is deteriorating, thereby allowing the user to take appropriate measures, such as investing in the correct filtration system for their water supply, for example.

There have been systems for monitoring water leaks in a residence. For example, U.S. Pat. No. 9,383,289 B1 of Meyer discloses a water leak detection system for detecting leaks in residential and commercial buildings. However, Meyer lacks the ability to manage and meter water usage, prevent pipes from freezing, and detect and maintain water quality. Furthermore, the system of Meyer lacks the ability to adaptively learn the water usage patterns of users. The present invention combines sensor data and cloud analytics to precisely detect and reduce catastrophic water related incidents, such as leaks, frozen pipes, over consumption, and poor water quality. As an example, the system while allowing for remotely shutting off water supply during leaks to reduce damage also performs analytics to provide water usage information and leak reports to a user to aide in the conservation of water. The present invention combines different functionalities into a single device. Herein, the present invention may be implemented as a single meter system which allows for pressure sensors, temperature sensors, and water quality sensors to be readily inserted in line to the water system. This arrangement is not obvious because it involves a specific meter design of the present invention that allows for all the relevant information for the analytics engine to be collected at the entry point of the home.

Any feature or combination of features described herein are included within the scope of the present invention provided that the features included in any such combination are not mutually inconsistent as will be apparent from the context, this specification, and the knowledge of one of ordinary skill in the art. Additional advantages and aspects of the present invention are apparent in the following detailed description and claims.

SUMMARY OF THE INVENTION

The present invention discloses a water management system that includes a water meter that is installed inline at an entry point of the main water system into the home. As such, the system includes modules for ultrasonic flow sensing, temperature sensing, pressure sensing, and water quality sensing. In addition, water contact sensors placed throughout a home may be used for appliance leak detection. Pressure sensors positioned within the main meter may also be employed to monitor water pressure on the main line and alert a user if the pressure drops suddenly. Ultrasonic flow sensors of the water system accurately measure water consumption.

In some aspects, the present invention discloses a leak monitoring system effective for detecting and stopping a water leak. As will be disclosed herein, the system may include a water meter inline to a main water valve, wherein the water meter may be configured to provide water usage data to a collector unit, wherein the collector unit aggregates said water usage data into a first set of data. The system may further include a system controller comprising a memory and a system processor operatively coupled to the collector unit, wherein the memory stores instructions executable by the system processor, wherein the first set of data may be transmitted by the collector unit to the system processor where the first set of data may be organized and synthesized resulting in a second set of data.

In some embodiments, the system may include a remote database wirelessly coupled to the system processor for storing the first set of data and the second set of data, wherein upon installation, the collector unit may perform an initial calibration, wherein the initial calibration may be a continuous collection of information received from the water meter describing a water usage, wherein the continuous collection of data may last for a predetermined time period resulting in the first set of data, which may be transmitted by the collector unit to the system processor. Additionally or alternatively, the first set of data may be organized and synthesized by the system processor to produce the second set of data and the second set of data may be used to create a user signature characterizing the water usage of a user, and wherein the user signature may be stored in the remote database.

In some embodiments, the system may include a valve actuator operatively coupled to the main water valve, wherein the valve actuator may be configured to open or close the main water valve, wherein the valve actuator may be wirelessly coupled to the system processor. Additionally or alternatively, the system may include a user electronic device configured to access the system processor, wherein communication between the user electronic device and the system processor may be accomplished via a telecommunications network.

In some embodiments, after the initial calibration produces the user signature, a continuous calibration may monitor water usage and the first set of data may be continuously updated, wherein the updated first set of data may be compared to the user signature by the system processor to detect a leak. When the leak is detected, the system processor may notify the user electronic device, wherein the user may indicate to the system processor via the user electronic device whether or not to close the main water valve. In some aspects, the user may optionally shut off a source of the leak manually or permit the system processor to remotely shut off the main water valve via the valve actuator, thereby stopping the leak.

The collector unit may log a day and a time of day to water usage data measured by the water meter such that the first set of data, the second set of data and the user signature are time-based. Additionally, or alternatively, a temperature sensor and a pressure sensor may be integrated into the water meter.

The user signature may include a volume of water flow, an amount of water consumption, a water temperature, and a water pressure for a given day and time of day. Additionally, or alternatively, the user signature may further include one or more sets of data each tied to a node in a user home, wherein information detailed in each set of data may be time-based and may include the volume of water flow, the amount of water consumption, the water temperature, and the water pressure for the given day and time of day at a particular node, wherein each node in the user home may include an appliance having a water source fluidly connected to the main water valve of the user home.

In some embodiments, the system processor may detect a leak at a node when a current measurement of the volume of water flow or change in the water pressure detected by the water meter or pressure sensor for a given day and time of day at the node deviates beyond a given threshold from a measurement stored by the user signature for that given day and time of day at the node.

The system processor may send an alert to the user electronic device indicating a leak has been detected and advising the user to shut off the main water valve or one or more valves associated with the node at which the leak is occurring. Additionally or alternatively, the system processor may send an alert to the user electronic device indicating a leak has been detected and requesting permission to remotely shut off the main water valve, wherein the user may permit or deny the shutting off of the main water valve. The system processor may send an alert to the user electronic device indicating a leak has been detected and automatically shuts off the main water valve, remotely, after a set time interval has passed, wherein the set time interval may be preset by the user.

In some embodiments, during continuous calibration, a usage pattern deviating from the user signature, indicating overconsumption, may be identified by the system processor, wherein the system processor may send an alert to the user electronic device describing the deviation allowing the user to preemptively address a potential problem. The system processor may notify the user, via the user electronic device, when a drop in water temperature above a preset threshold is detected by the temperature sensor. Additionally or alternatively, the system processor may send a reminder to the user, via the user electronic device, to turn on one or more faucets associated with the one or more nodes of the user home when the drop in water temperature above the preset threshold is detected.

In some embodiments, wherein a smoke detector system is integrated into the water meter such that when the smoke detector system is activated, the valve actuator may not close the main water valve if a significant increase in the volume of water flow occurs. Additionally or alternatively, the system may include a contact sensor operatively coupled to the collector unit, wherein the contact sensor may be disposed within a predetermined distance from an appliance requiring water, wherein the contact sensor may be in contact with a region of a surface upon which the appliance sits. The contact sensor may be configured to detect when the region is wet, and if the region is wet then the contact sensor may notify the collector unit via a signal, wherein the collector unit notifies the system processor to shut off a valve delivering water to the appliance via a second valve actuator. One or more contact sensors are each operatively coupled to one or more appliances.

In some embodiments, the user may receive a report from the system processor comprising time-based water consumption information, information describing one or more detected leaks, or information on one or more overconsumption events.

According to some embodiments, an integrated water management system effective for metering water usage, detecting and stopping a water leak, and reusing grey water is provided. The system includes a water meter inline to a main water valve, wherein the water meter is configured to provide water usage data to a collector unit, and an irrigation system configured to receive weather data, city requirements for water use, and soil moisture levels and provide a water consumption data from different regions to the collector unit.

The system may additionally or alternatively include a grey water management system configured to provide grey water data to the collector unit. The system may further include a system controller comprising a memory and a system processor wirelessly coupled to the collector unit, wherein the memory stores instructions that, when executed by the system processor, may cause the system processor to perform operations comprising: generating a user signature based on the water usage data, the user signature characterizing the water usage of a user, wherein the system processor detects a leak based on the user signature, generating a water consumption plan based on the water consumption data to water a region having a lower than threshold water level; and generating a grey water route plan based on the grey water data to redirect grey water to zones that have a lower than threshold moisture levels.

In some embodiments, the system may include a remote database wirelessly coupled to the system processor for storing the user signature, the water consumption plan, and the grey water route plan, a valve actuator operatively coupled to the main water valve, and a user electronic device configured to access the system controller. The valve actuator may be configured to adjust the main water valve based on one or more of the user signature, the water consumption plan, and the grey water route plan, wherein the valve actuator may be wirelessly coupled to the system processor (109). Additionally or alternatively, communication between the user electronic device and the system processor may be accomplished via a telecommunications network.

In some embodiments, when the leak is detected, the system processor may notify the user electronic device, wherein the user indicates to the system processor via the user electronic device whether or not to close the main water valve, wherein the user may optionally shut off a source of the leak manually or permit the system processor to remotely shut off the main water valve via the valve actuator thereby stopping the leak. Additionally or alternatively, when the region having lower than threshold water level is detected, the system processor may notify the user of the region via the user electronic device to adjust the main water valve, via the valve actuator, to direct increased water flow to the region.

In some embodiments, when zones having lower than threshold moisture levels are detected, the system processor may notify the user of the zones via the user electronic device to adjust the main water valve, via the valve actuator, to decrease incoming water and increase grey water, thereby reusing the grey water, reducing a demand for fresh clean water and reducing waste water.

In some embodiments, the system may include a smoke detector system integrated into the water meter such that when the smoke detector system is activated the valve actuator may not close the main water valve when a significant increase in the volume of water flow occurs, wherein the significant increase in the volume of water flow results from water used to put out a fire that initially triggered the smoke detection system, thereby combating the fire. Additionally or alternatively, the system may include a contact sensor operatively coupled to the collector unit, wherein the contact sensor is configured to detect wet level around an appliance of a node, wherein if the region is wet then the contact sensor may notify the collector unit via a signal, wherein the collector unit may notify the system processor to shut off a valve delivering water to the appliance via a second valve actuator, thereby reducing further leaks.

According to some embodiments, a method for alerting a user of a potential leak in a water system and identifying an actual leak is provided. The method may include installing a leak monitoring system to the water system, wherein the leak monitoring system may include a water meter inline to a main water valve, wherein the water meter is configured to provide water usage data to a collector unit. The leak monitoring system may include a remote database wirelessly coupled to a system processor for storing the water usage data and a system controller comprising a memory and the system processor operatively coupled to the collector unit, wherein the memory stores instructions that are executed by the system processor.

In some embodiments, the method may include performing an initial calibration using the collector unit for a predetermined day and time of day, to determine a water usage by the water system, and capturing, using the collector unit one or more of volume of water flow, water pressure, water temperature, and flow rates before and after a water consumption event. Additionally or alternatively, the method may include determining a user signature using the system processor, said user signature based on the one or more of the volume of water flow, the water pressure, the water temperature, and flow rates, and performing continuous calibration using the collector unit to monitor the water usage by the water system after the initial calibration.

In some embodiments, the method may include deducing an overconsumption, via the system processor, and alerting the user of the overconsumption and the potential leak via a user electronic device in response to a measurement deviating beyond a threshold, the measurement comprising the volume of water flow, the water pressure, and the water temperature, and the flow rates. Additionally or alternatively, the method may include generating an overconsumption report using the system processor thereby allowing for the user to effectively monitor the water usage, and confirming the potential leak is the actual leak in response to the overconsumption lasting for longer than a threshold time, thereby allowing for the user to preemptively address the potential leak.

The method may additionally or alternatively include sending an alert to the user electronic device indicating a leak has been detected and automatically shutting off a main water valve of the water system, remotely, after a set time interval has passed, wherein the set time interval is preset by the user. The flow rates may include a first flow rate and a second flow rate, wherein the first flow rate is a flow rate before the water consumption event begins, and the second flow rate is the flow rate after the water consumption ends, and wherein the actual leak is confirmed when the second flow rate remains higher than the first flow rate.

The system of the present invention creates a signature for each home or office based on water consumption statistics, temperature measurements, pressure statistics, user input (to a mobile application or "mobile app"), water quality information using water quality probe, and contact sensor inputs to detect leaks, and frozen pipe conditions. The system adaptively learns water usage pattern in the home/office and looks for any deviation from the regular pattern.

Some of the advantages of the system include water management and consumption tracking, leak detection, water quality monitoring, irrigation management, submetering and billing for water consumption and remote shutoff, detailed daily, weekly, monthly, and yearly water consumption reports, freeze detection in pipes and control to reduce pipe damages, pressure sensor to maintain recommended water pressure, and detecting frozen pipes anywhere in the home/office. Another main advantage of the present invention is that all the information about the water is collected in real time and continuously analyzed to build the user signature.

The system uses objective methods to automatically shut off the valve and subjective methods to determine leak conditions and alert the user to shut off the main valve. As an example, a flood sensor of the sensor may detect water on the ground below an appliance, and the system may automatically shut off the valve to stop the water flow. As another example, the system may adaptively learn, using a combination of flow rate, volume of consumption, pressure, time and consumption patterns, that a leak may be present, and accordingly proceeds to alert the user about the leak, and take mitigating steps.

The system is configured to effectively manage every aspect of water in both residential, commercial, and irrigation application. The system additionally includes long range sensors (e.g., 915 Mhz radio), long-range data collection capability (e.g., the collector unit collect data from sensors for over 16 miles and can send data to cloud in real-time), and controls that manage the valve state remotely. In one example, the water meter of the system may use ultrasonic flow sensors to accurately measure water consumption and the system can aggregate data from over 100 such meters location around different locations in and around the building to allow for extensive and effective water management. In some examples, the system may use weather patterns and communicate with moisture sensors and adjust valve operation, to manage irrigation. The sensor and water usage data may be saved in a remote database (e.g., cloud) and as such, data analytics may be continually performed on the data for advanced adaptive learning. Such adaptive learning techniques may be used to precisely predict leaks, frozen pipe scenarios, and further reduce catastrophic damages caused by sudden leak events. In some examples, the system may communicate with smoke sensors to detect a fire and make sure the water meters are kept open in case water is needed to douse the fire.

One of the unique and inventive technical features of the present invention is that the system uses the inbuilt sensors (pressure, temperature, ultrasonic flow, and water quality sensors) to constantly monitor pressure, temperature, flow, and quality and calibrates water pattern for each of these metrics based on usage. As such, the constant monitoring is performed remotely using mobile app and cloud analytics. In addition, the present invention determines the user's unique water signature based on the water usage. As an example, the system looks for patterns of water consumption and quiet periods (i.e. no water consumption) in the home. If there is an uncharacteristic change in the water usage, then the system alerts the user. For example, if there is an unexpected increase in water consumption (e.g., overconsumption), the system alerts the user about the increased water usage, and the user may then adjust his/her water consumption. If there is an uncharacteristic drop in water pressure or the sudden change in the water quality metrics, then the user is alerted, for example. In this way, the system provides the user with the ability to monitor daily water usage and thus, regulate water consumption. Without wishing to limit the invention to any theory or mechanism, it is believed that the technical feature of the present invention advantageously provides for detecting potential leaks and alerting the user about the leaks. For example, if the increase in water consumption continues for over an hour, the system alerts the user about the leak and requests the user to turn off the main water valve to shut off the water supply or, remotely shuts off the main valve (e.g., if user is away), to reduce any further water loss and damage. None of the presently known prior references or work has the unique inventive technical feature of the present invention.

BRIEF DESCRIPTION OF THE DRAWINGS

The features and advantages of the present invention will become apparent from a consideration of the following detailed description presented in connection with the accompanying drawings in which.

DESCRIPTION OF THE PREFERRED EMBODIMENTS

Figure 1:
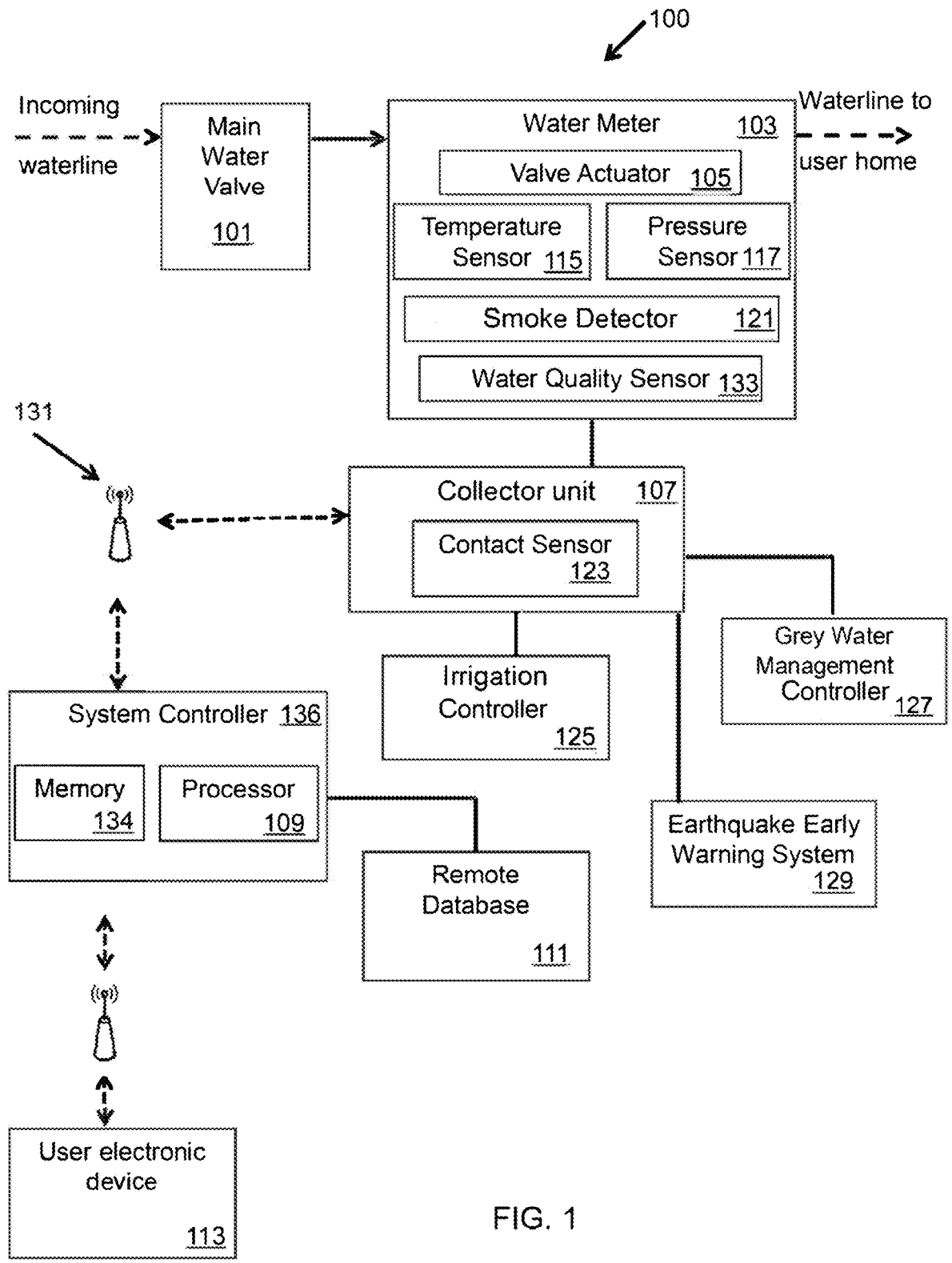
FIG. 1 shows a diagrammatic representation of the present system.

Following is a list of elements corresponding to a particular element referred to herein:

100 leak monitoring system, integrated water management system
101 main water valve
103 water meter
105 valve actuator
107 collector unit
109 system processor
111 remote database
113 user electronic device
115 temperature sensor
117 pressure sensor
121 smoke detector system
123 contact sensor
125 irrigation control system
127 grey water management system
131 communication link
133 water quality sensor
134 memory
136 system controller
400 example relationship
401 water consumption event
402 first flow rate
404 second flow rate
406 water flow rate
408 trailing flow rate
410 first threshold
412 second threshold
600 schematic diagram
602 modular pipe
604 holes
606 sensors
700 schematic diagram
702 building
704 plurality of apartments
706 bluetooth gateway
708 main water line meter
710 long range (LORA) wireless system
712 cloud
714 cloud server
716 main water line
718 plurality of sensors Referring now to FIGS. 1-9, the present invention features a leak monitoring system (100) effective for detecting and stopping a water leak. In some embodiments the system comprises a water meter (103) inline to a main water valve (101) configured to provide water usage data to a collector unit (107) inside a home or building. In additional embodiments, a valve actuator (105) may be operatively coupled to the main water valve (101) and configured to open or close the main water valve (101). In some example embodiments, additional water meter (103) may be installed along an irrigation line to monitor water usage outside the home or building. The valve actuator (105) may also be wirelessly coupled to a system processor (109). In one non-limiting example, the water meter (103) may be an ultrasonic water meter which uses one or more ultrasonic transducers to determine the volume of water passing through the meter. Other non-limiting examples of the water meter include velocity water meter and electromagnetic water meter. The ultrasonic flow sensors may provide flow and consumption information for monitoring water usage, and for generating a user signature, as discussed further below.

The system (100) may include a system controller (136) comprising a memory (134) and the system processor (109) operatively coupled to the collector unit (107), wherein the memory stores instructions executable by the system processor (109) for performing the leak detection procedure, as discussed further below.

Figure 6:
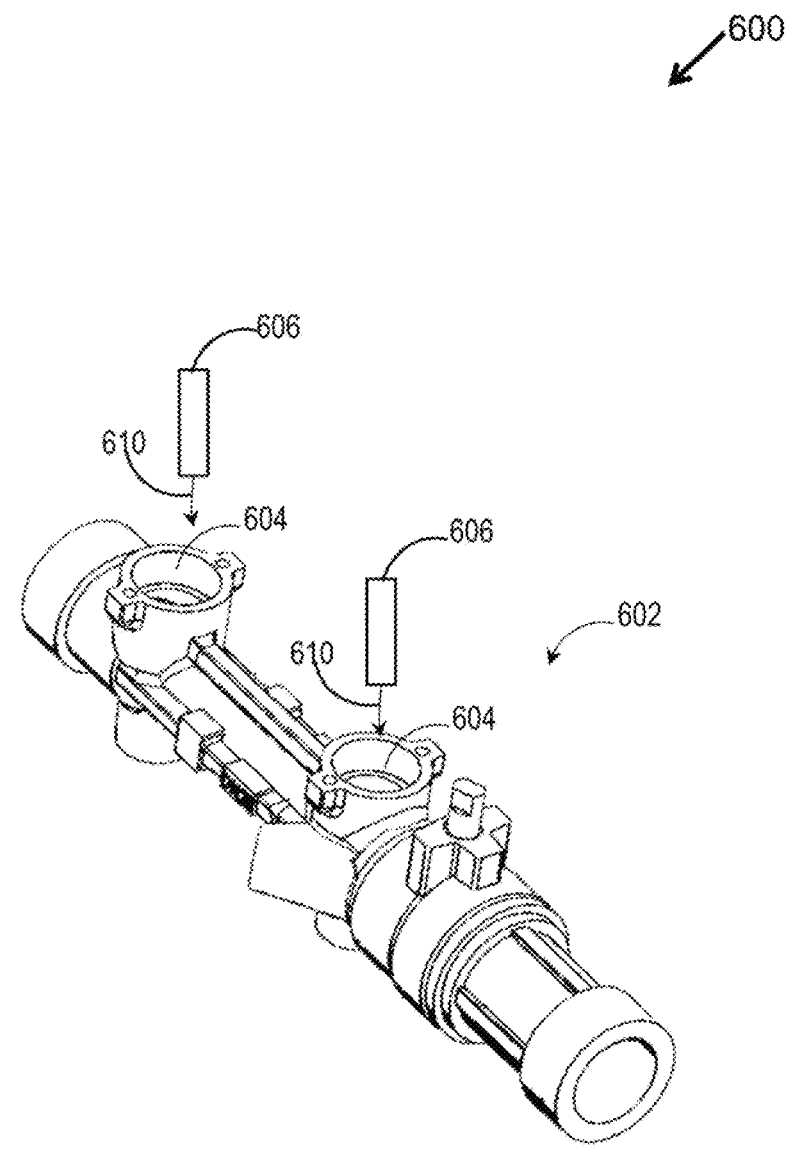
FIG. 6 shows a non-limiting embodiment of a modular pipe that may be integrated with the present system. Sensors may be disposed inside the pipe at various locations.

The water meter (103) may include a plurality of sensors (606) such as temperature sensor, pressure sensor, water quality sensor, humidity sensor, to name a few. Herein, the system (100) may include pipes that include a modular design that allows for the sensors to be readily integrated with the system, as shown in FIG. 6. Turning now to FIG. 6, a schematic diagram (600) of a modular pipe (602) is shown. The modular pipe (602) may include a plurality of holes or insets (604) along a length of the pipe (602). A plurality of sensors (606) may be inserted into the holes (604) along the pipe (as indicated by arrows 610). The modular design of the pipes allows for the sensors to be readily inserted into the pipes, and further facilitate detection and replacement of faulty sensors without much difficulty. In a non-limiting example embodiment, the modular pipe (602) may be mounted at an entry point of the home/office. Thus, all of the relevant information (such as temperature, pressure, moisture, water quality, for example) that are further analyzed by the processor (109) are collected at the entry point of the home. In this way, the system (100) collects all information about the water in real time and analyzes it continuously to build a user signature, as discussed further below.

Returning to FIG. 1, in some example embodiments, the water meter (103) may include the temperature sensor (115) configured to measure water temperature. The water meter (103) may additionally include the pressure sensor (117) configured to measure water pressure. The temperature sensor (115) and the pressure sensor (117) provide temperature (plot 900 shown in FIG. 9) and pressure readings (plot 800 shown in FIG. 8) that are used to calibrate the system (100). In some example embodiments, the temperature sensor (115) may be used to prevent pipes from freezing, and the pressure sensor (115) may be used to prevent pipes from bursting.

Figure 2:
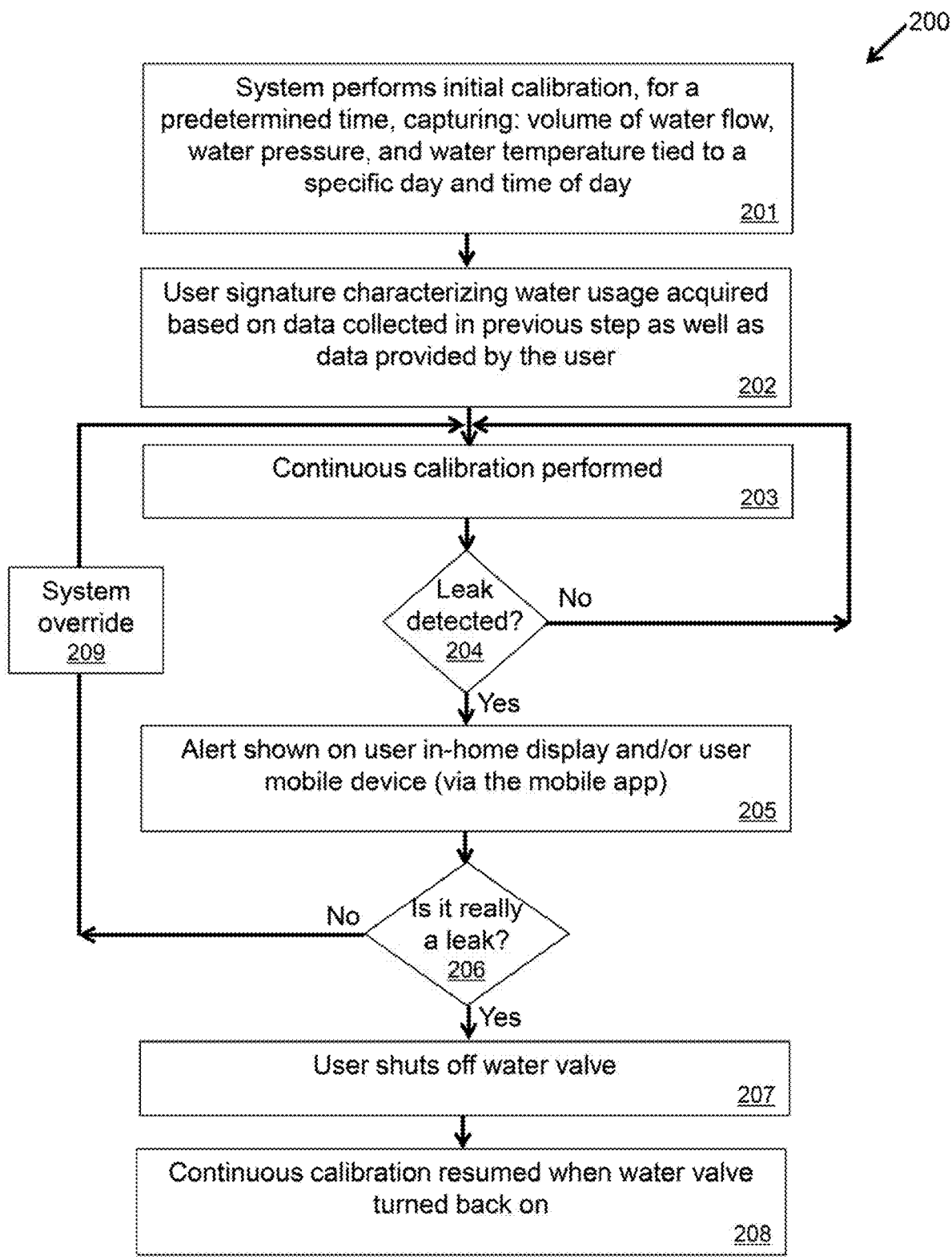
FIG. 2 is a flowchart detailing an exemplary process of leak detection for the present invention in Home Mode.

In some example, the temperature and the pressure readings are used to detect water leaks, prevent pipes from freezing, and as described further below with reference to FIGS. 2 and 3.

The collector unit (107) may operate to aggregate the water usage data into a first set of data. Further embodiments may feature a system processor (109) wirelessly coupled to the collector unit (107) via a communication link (131). Some non-limiting examples of the wireless communication link (131) include BLUETOOTH, WI-FI, Near-Field Communication [NFC], and mobile connectivity. The wireless communication link (131) may be configured to provide a two-way communication between a system processor (109) and the collector unit (107). The first set of data may be wirelessly transmitted by the collector unit (107) to the system processor (109) where it is organized and synthesized resulting in a second set of data. A remote database (111) may also be wirelessly coupled to the system processor (109) and configured to store the first set of data and the second set of data.

Consistent with previous embodiments, upon installation of the system, the collector unit (107) may perform an initial calibration. This initial calibration is a continuous collection of information received from the water meter (103) describing a water usage. The continuous collection of data may last for a predetermined time period (e.g. a week) resulting in the first set of data, which is wirelessly transmitted by the collector unit (107) to the system processor (109). The first set of data that is collected may include one or more of the water temperature, the water pressure, a zero-flow rate before and after a water consumption event, for example. In one example embodiment, the first set of data may be a calibration data. The initial calibration performed may be a manual calibration performed by a plumber during installation, for example. The initial calibration ensures that there is no pre-existing leak which could potentially skew the analytics. As an example, during the initial installation, if issues (or leaks) are detected, then the issues/leaks are fixed before the automatic system calibration is performed.

The initial set of data that is collected after the initial installation may include one or more baseline pressure when there is no water flow, baseline flow rate (when all valves in the home are turned off, for example), baseline water quality when the system was installed, number of home occupants (via mobile app, for example), and home type (e.g.: 3 bath, 2 toilets, and the like). As an example, the baseline flow rate may be the rate when all the valves in the home are turned off. However, there may still be some flow for a specific zone if there is a water circulating tank.

In some embodiments, the calibration procedure is run for a minimum period of time, such as about 3 to 10 days, in order to obtain a baseline consumption, pressure water quality signature. After calibration, the system is configured to determine anomalies based on the algorithm to act appropriately and to also continue its adaptive learning. As user pattern changes, e.g. there are more occupants added or reduced in the home, then the water consumption changes over time and the signature adaptively changes. For example, the system can accurately know the signature of a shower event, a toilet flush event, a washing machine event, or a faucet use event.

The second set of data, synthesized from the first set of data, is used to create a user signature characterizing the water usage of a user. As an example, the user signature may include one or more of a volume of water flow, an amount of water consumption, a preferred water temperature, a desired water pressure for a given day and for a specific time of day, at a particular node. Herein, each node in the user home includes an appliance having a water source derived from the main water valve (101) of the user home. The user signature may also be stored in the remote database (111).

Figure 5A:
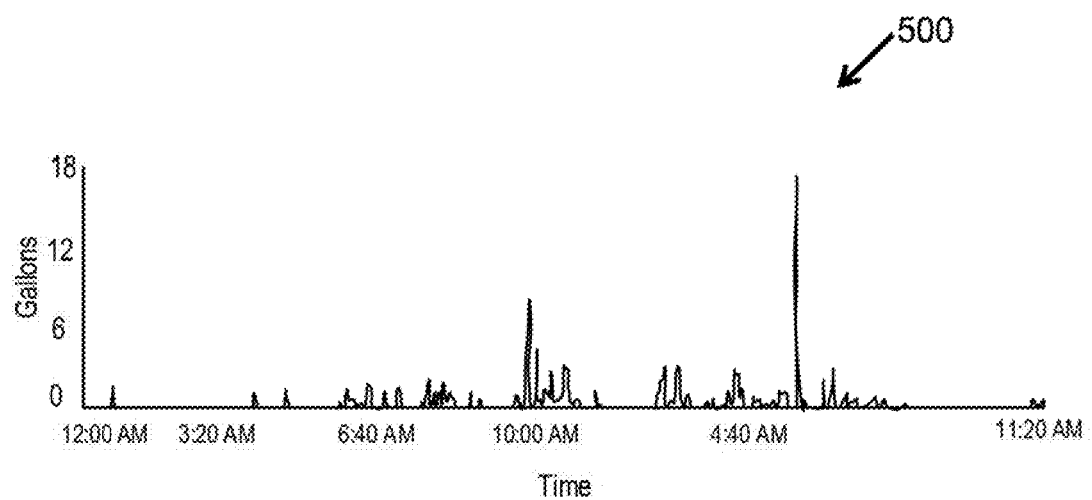
FIGS. 5A-5B show example water signature plots.
Figure 5B:
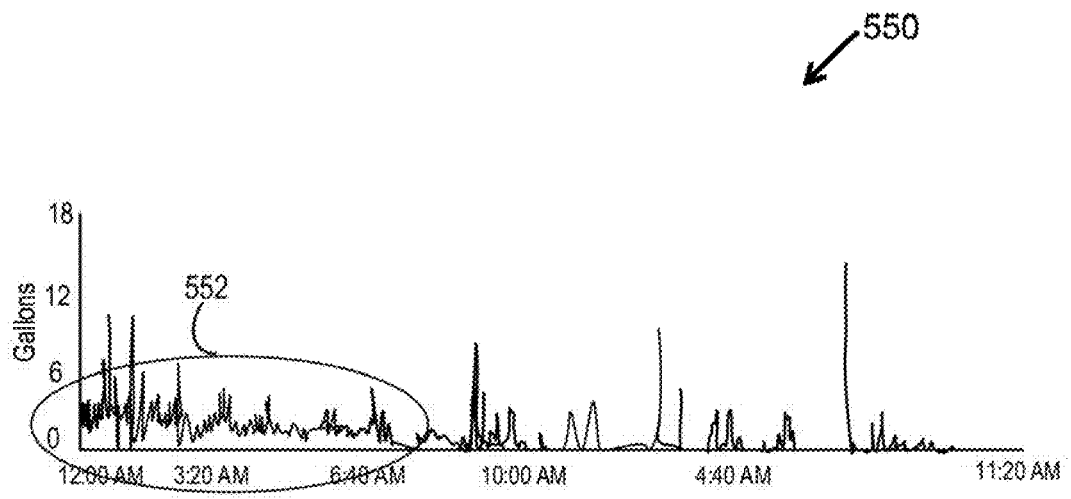

Water signature for a single home is shown in an example plots 500 and 550 of FIGS. 5A and 5B. Time is shown along X-axis, and water consumption in gallons is shown along Y-axis. Plot 500 shows low consumption at specific zones (e.g., and dense consumption in some other zones. As an example, the water consumption is low between 12:00 AM and 6:30 AM. The system collects the water consumption data from the water meter. In some examples, the data may be collected every second. By collecting, the data constantly from the meter, the system may deduce that a single event occurring around 10:00 AM, may be due to the user taking a shower, for example. Herein, the combination of consumptions with the highest volume of water used or the highest time may be used to establish the single event (e.g., taking shower). As an example, a user may set a water consumption tolerance limit (on the mobile app preference, for example) which may include one or more of a time and a volume of water, and if any single event exceeds the limit, the user may be notified. In one specific example, a user may set a tolerance limit of 15 gallons and 10 min. If the user takes a shower that was 15 minutes long and/or uses 30 gallons of water during the shower, the user may be notified of overconsumption. In this way, the user may be able to constantly monitor the water usage.

If there is any anomaly in the water consumption, the user may be alerted. As shown in FIG. 5B, there is a sudden increase in water consumption in the circled time interval (552). The increased consumption between 12:00 AM and 6:40 AM may indicate a "running toilet" or that a faucet is left open. When the system detects the increased consumption, the system may send an alert to the user. If, for example, the user has set an "Away Mode", any consumption unless it is a planned event like watering the garden is considered a leak event and the valve is automatically shut off.

Figure 8:
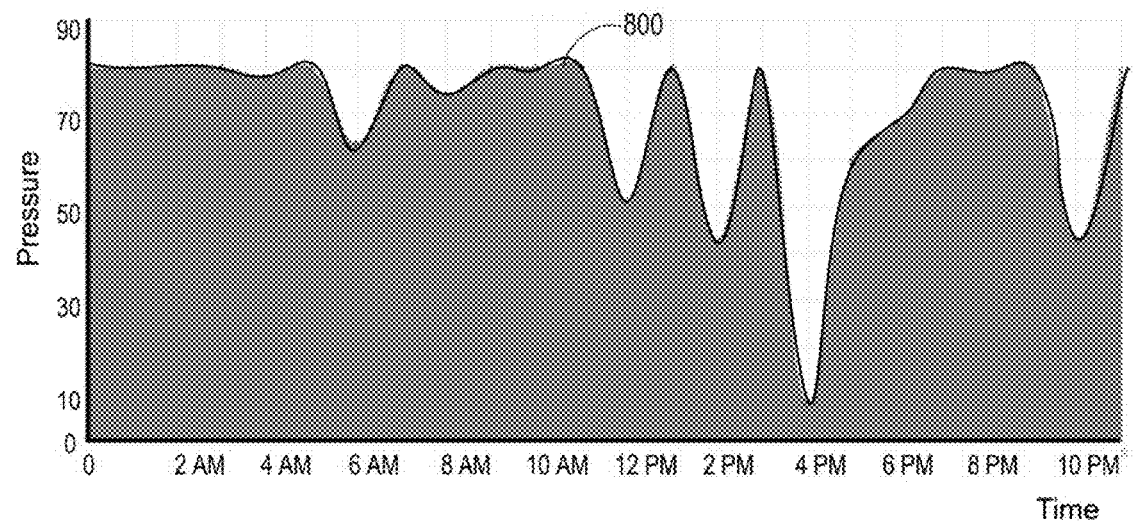
FIG. 8 is a non-limiting example of a pressure reading acquired by the system during a single day.

In some example embodiments, the user signature may include pressure, temperature, and flow information. A sudden drop in pressure may be treated as a flag for a burst pipe situation, as shown in FIG. 8. Plot 800 of FIG. 8 illustrates pressure readings that are collected during a single day, for example. The system continuously records and monitors the pressure inside the pipe. In one example, the system may measure the pressure every hour. In other examples, the system may measure the pressure every half-hour. Herein, there is a sudden drop in pressure (as shown at 4 PM in plot 800), wherein the pressure reading decreases from about 80 pounds/square inches at 3 PM to about 8 pounds/square inches at 4 PM. The system may deduce that the drop in pressure is most likely due to a burst pipe, and in order to reduce any further damage, the system may automatically shut off the main valve to turn off the water supply.

A sudden drop in temperature below the threshold temperature when the user is away in winter may be treated as a flag and may activates a freeze protection algorithm. As an example, if the user sets a "VACATION-Winter mode", the system may request the user to leave one or more faucets open in the home and shut off the main line (or the system shuts off the main line when the user leaves the house for the vacation). The system continues to monitor the sensor outputs. If the output of the temperature sensor drops below a threshold temperature (e.g., below 0° C.), the system may open the main valve and allow water to flow (or trickle) through the pipes. In this way, the system prevents the pipe from freezing. In some example embodiments, the system may receive weather data, and if there is prediction of sub-zero temperatures in the forecast, the system may automatically turn on the main valve to allow water to flow through the pipes, thereby preventing the pipe from freezing.

The system is in continuous adaptive learning and calibration mode, and hence the user signature is continuously monitored and calibrated allowing for effective monitoring of water usage by the system. During this monitoring period, a leak may be detected when a present measurement of the volume of water flow or change in the water pressure (detected by the water meter (103)) is uncharacteristic for the given day and time of day at a specific node. The present measurement is uncharacteristic if it deviates beyond a given threshold from a measurement stored by the user signature for the same day, time of day and node. To illustrate, if all the occupants in a user's home are typically out of the home during weekday afternoons, the user signature indicates no water usage by an appliance (e.g. a washing machine) for those time periods. If the system detects a large volume flow of water from the washing machine on a Monday at 1 pm, the system notifies the user that a leak at the washing machine has been detected.

In some example embodiments, the system (100) may detect leaks based on a contact or flood sensor (123). The contact sensor (123) may be operatively coupled to the collector unit (107). Disposed within a predetermined distance from an appliance using water derived from the main water valve, the contact sensor is in contact with a region of the surface upon which the appliance sits (e.g. on the floor at the base of a washing machine). The contact sensor may be configured to detect when the region is wet. If water is detected, then the contact sensor sends a signal to the collector unit (107), which informs the system processor (109) to shut off the valve delivering water to the appliance via a second valve actuator. In further embodiments, the system may comprise one or more contact sensors. Additionally, contact sensors may be employed to detect water leakage from one or more appliances whose water source is not the main water valve (101). In these cases, the system may notify the user of the leak and advise the user to manually shut off the valve(s) delivering water to the appliance(s).

Figure 4:
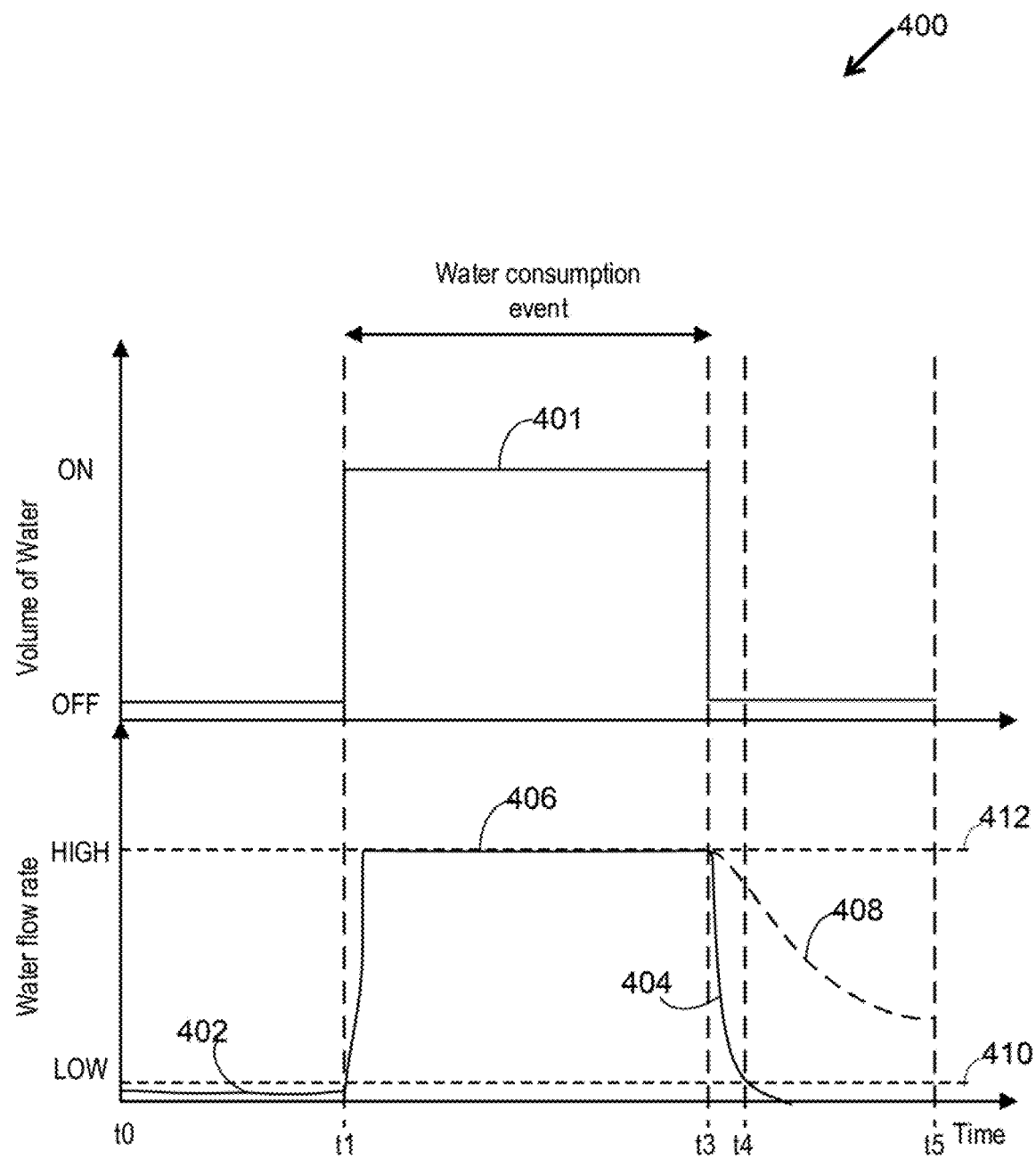
FIG. 4 shows an example relationship between a water consumption event and a water flow rate to detect leaks.

In example embodiments, the leak may be detected based on comparing a flow rate before and after a water consumption event has occurred, as shown in FIG. 4. A water consumption event is any event that draws water from the main line. For example, operating a washing machine/dish washer is considered to be a water consumption event. Other non-limiting examples of water consumption events include turning on the sprinklers to water the lawn, turning on a shower or faucet, and the like. As such, if there is no water leak, then the flow rate is expected to drop to a threshold (about zero) after every consumption event. However, if the flow rate does not drop back to the threshold after the consumption event ends, then a leak is indicated, as shown in FIG. 4.

Turning now to FIG. 4, an example relationship (400) between a water consumption event and a water flow rate is shown. The flow rate before a water consumption event (401) is referred to as a first flow rate or leading flow rate (402). Herein, the water consumption event (401) occurs between time t1 and t2. In one example embodiment, the flow rate may be determined by ultrasonic flow sensors on the main water meter on the main water supply line. Before time t1 (or before the water consumption event occurs), there is no water flow and hence the leading flow rate (402) stays below a first threshold (410) (about zero, for example). However, if the leading flow rate is higher than the first threshold before the water consumption event starts, the system (100) may identifies that as a potential leak situation, and continue to monitor the flow rate during and after the water consumption event ends to determine if there is an actual leak.

During the water consumption event (between time t1 and t2), the water flow rate (406) is adjusted to a second threshold (412). The second threshold (414) may be a maximum flow rate that is determined based on the desired volume of water, the type of node, for example. In some examples, if the water flow rate (406) is unable to reach the second threshold (412), the system may identify a potential leak situation, and may continue to monitor the water flow rate throughout the water consumption event.

At time t3, the water consumption ends (washing machine has completed the wash cycle, for example) and the water flow is expected to fall back to the threshold (410). The water flow rate after the water consumption event has ended is called a second flow rate or trailing flow rate (404). If the trailing zero flow rate (404) falls below the first threshold (410) in a threshold time (e.g., between t3 and t4), then there is no leak present. In an example situation, if the trailing flow rate (408) does not reach the first threshold (410) within the threshold time after the water consumption event (401) has ended, and continues to remain higher than the first threshold (410), then leak may be indicated. In this way, by monitoring the leading and the trailing flow rates, leaks may be detected, and a user may be notified of the leak, as discussed below.

The water meter (103) of the system (100) may be coupled to a water quality sensor (133) which is configured to detect impurities (e.g., solids, bacteria) in the water. Based on the level of impurities detected, the system (100) may alert users and/or water purification companies to select and replace filters. In this way, the system (100) may monitor the quality of water in the lines.

In some example embodiments, the water meter (103) may include a smoke detector system (121) configured to adjust operation of the main water valve (101). As an example, when the smoke detector system (121) is triggered, a valve actuator (105) may be adjusted so that the actuator does not close the main water valve (101) even when a significant increase in the volume flow of water occurs (since an increase in water volume is expected, i.e. to put out the fire that initially triggered the smoke detector system). In this way, the system (100) may be used in conjunction with sprinkler systems to combat detected fires.

In some example embodiments, the collector unit (107) may be integrated with an irrigation control system (125). The irrigation control system (125) manages water consumption for watering backyards and front yards, for example. The irrigation control system (125) may be configured to receive weather data, city requirements for water use, and soil moisture levels, which may then be used to generate a water consumption data. As such, the water consumption data may indicate regions that have lower than threshold water level. Once the regions are identified, the system (100) may generate a water consumption plan to direct more water to the identified regions. The system (100) may adjust the valve actuator (105) to increase the water delivery to the regions having lower water levels. In some examples, the system (100) may adjust valve actuators of the irrigation control system (125) to selectively increase water delivery to the regions with low water levels. In this way, the system (100) maintains water delivery to the regions at the desired level.

In some example embodiments, the collector unit (107) may be integrated with a grey water management system (127). As such, the grey water or sullage is all wastewater generated in households or office buildings from streams without fecal contamination. The grey water management system (127) manages water from all streams except for the wastewater from toilets. Examples of sources of grey water include, sinks, showers, baths, clothes washing machines or dish washers. In some example embodiments, the collector unit (107), collects grey water data from the grey water management system (127) and additionally collects soil moisture level data from the irrigation control system (125) and sends the data to the system processor (109). As an example, the grey water system may provide grey water data to the collector unit (107). The system processor (109) may determine the areas/zones with low soil moisture, and accordingly direct the grey water to the areas in order to increase the soil moisture in the areas. The system processor (109) may be configured to generate a water consumption plan based on the grey water data. As such, the water consumption plan may include identifying zones that have a lower than threshold moisture level. The moisture level is volumetric water content (VWC). As such, the threshold moisture level may be a moisture level selected level by a user depending on type of plants, soil type, for example. In some examples, the soil may need to be damp to the root zone, about 6 to 12 inches deep. In some more example, sandy soil drains quickly and may need be watered when the soil is dry to a depth of 2 to 4 inches. Most succulents require dry soil and infrequent watering while some plants, such as columbine, prefer consistently moist soil. Thus, the threshold moisture level may be set by the user based on the plants, and soil type. In some example embodiments, the user may input the soil type and plant information, and the system may determine the moisture level that is needed and accordingly select the threshold moisture level.

Herein, the identified zones require more water. Thus, when zones having lower than threshold moisture levels are detected, the system processor (109) notifies the user of the zones via the user electronic device (113) and further requests the user to adjust the main water valve (via the valve actuator) to decrease incoming water and increase grey water. Thus, the grey water may be reused, thereby reducing a demand for fresh clean water and reducing waste water that required treatment. In this way, the system (100) adaptively integrates multiple systems to divert and direct grey water where it is needed the most, thereby maintaining the soil moisture levels. In addition, grey water reuse provides substantial benefits for both the water supply subsystem by reducing the demand for fresh clean water as well as the wastewater subsystems by reducing the amount of wastewater required to be conveyed and treated. Thus, the system (100) of the present invention is an integrated water management system that effectively monitors and meters water usage, detects and stops water leaks, and reuses grey water and enhances water conservation.

In additional embodiments, the system processor (109) may notify the user, via the user electronic device (113), when a drop in water temperature above a preset threshold is detected. The system processor (109) may send a reminder to the user, via the user electronic device, to turn on one or more faucets associated with the one or more nodes of the user home when the drop in water temperature above the second threshold is detected. This ensures water flow through pipes during periods of sustained low temperatures and allows the user to avoid damage resulting from frozen pipes.

A further embodiment allows a user access to water usage reports from the system processor (109). These reports may comprise time-based water consumption information, information describing one or more detected leaks or overconsumption reports.

In some example embodiments, the system (100) may be integrated with an earthquake early warning system (129). When an earthquake warning is issued by the earthquake early warning system (129), the system may receive the warning, and accordingly alert the user about the earthquake warning. In addition, the system (100) may automatically turn off the valve to shut off the water supply to the house/building to prevent flooding and to further reduce electrical fires and damages that can otherwise occur.

The system detailed heretofore is descriptive of an embodiment of the present invention comprising a single-dwelling unit (SDU), e.g. a home or apartment having one or more persons comprising the (single or collective) user. Alternate embodiments feature multi-dwelling units (MDU) such as apartments or hotels, where aggregate data is acquired and provided to one or more users. For example, water usage data may be acquired for a (single or collective) user in each apartment of an apartment cooperative (co-op). Instead of dividing the water bill equally among the apartments, system acquired data may allow the co-op to divide the water bill based on usage.

Further, communication between the system processor and the user electronic device may be accomplished via a system mobile app. The mobile app may allow the user to provide the system additional information to increase the accuracy in leak detection. For example, a user signature may be acquired for a user comprising a family of four in a SDU. If the user hosts two houseguests for a week, the water usage may potentially increase by 50% and the system will erroneously report overconsumption to the user. However, with the mobile app, the user may set the number of persons in the home and notify the system of any additional persons temporarily staying in the home (and a length of time indicating the length of stay). A second user signature may then be created and temporarily used to detect a potential leak.

Additionally, while the system is in Away Mode, the user may pre-report water usage events to the system via the mobile app. More specifically, since the system registers any water use as a leak while the system is in Away Mode, the user may set the mobile app to work around the restriction. For example, if a user wants lawn sprinklers to operate while away from home, the user may notify the system of the event so that the system will detect the water usage without erroneously reporting a leak. The mobile app may also allow users to tag specific consumption patterns (e.g. a long shower, washing machine use, etc.) to aid the system in creating a more refined user signature.

In other embodiments, the system may be used to assess the overall health of pipes in the user home. For example, contact sensors may be configured to detect a leak in a garbage disposal coupled to the kitchen sink. Contact sensors may also be employed for washing machines, dishwashers, and water heaters. Further, insurance companies may utilize the system to assess a customer's risk for water related damages. Consumer reports describing the frequency of leakage and overconsumption events and a custom display may also be supplied to insurance companies.

A user electronic device (113) may be configured to access the system processor (109), where communication between the user electronic device (113) and the system processor (109) is accomplished via a telecommunications network. Examples of the user electronic device may include a mobile phone, tablet, or any electronic device capable of remote communication with the system processor (109). After the initial calibration produces the user signature, a continuous calibration may be employed to monitor water usage and the first set of data may be continuously updated by the system processor (109). The first set of data is compared to the user signature by the system processor (109) to detect a potential leak. If a potential leak is detected, the system processor (109) may notify the user electronic device (113). The user may then indicate to the system processor (109), via the user electronic device (113), whether or not to close the main water valve. To illustrate, if the user is at home he may deny permission to close the main water valve and may shut off the source of the potential leak manually, as described in FIG. 2. If the user is away from home, permission may be granted to allow the system processor (109) to remotely shut off the main water valve (via the valve actuator), as described in FIG. 3. The user may set the system in one of two modes: Home Mode or Away Mode, and the system processor (109) may perform either method 200 of FIG. 2 or method 300 of FIG. 3, based on the mode setting. Method 200 shown in FIG. 2 is performed when the system is set in Home mode, and method 300 shown in FIG. 3, described further below, is performed when the system is in Away mode, Turning now to FIG. 2, an example method 200 for leak detection in home mode or when the user is at home, is shown. Instructions for carrying out method 200 and the rest of the methods included herein may be executed by a system processor (such as the system processor (109) shown in FIG. 1) based on instructions stored on a memory of a controller (such as the system controller (136) of FIG. 1) and in conjunction with signals received from sensors of a water meter (such as the water meter (103) shown in FIG. 1), such as the sensors described above with reference to FIG. 1. The processor may employ valve actuators of the water meter to adjust water flow, according to the methods described below.

At 201 of method 200, a collector unit (such as the collector unit (107) shown in FIG. 1), ties a day and a time of day to water usage data measured by the water meter wherein, as a result, a first set of data, a second set of data, and a user signature are time-based. As discussed previously, data from the water meter is continuously collected for a predetermined time period (e.g. a week) resulting in the first set of data, which is then wirelessly transmitted by the collector unit to the system processor. The first set of data is organized and synthesized to produce a second set of data. At 202, the second set of data is used to create a user signature characterizing the water usage of a user. Herein, the user signature may include the volume of water flow, the amount of water consumption, the water temperature, and the water pressure for a given day and time of day. Additional embodiments feature a user signature further comprising one or more sets of data each tied to a node in the user home. Information detailed in each set of data may be time-based and comprise the volume of water flow, the amount of water consumption, the water temperature, and the water pressure for a given day and time of day at a particular node. A node may be any appliance in the user home having a water source derived from the main water valve, for example, a refrigerator.

At 203, method 200 performs continuous calibration. As mentioned earlier, continuous calibration allows for effective monitoring of water usage by the system after the initial calibration, and the first set of data may be continuously updated. Next, at 204, method 200 determines if a leak has been detected. As previously described, a leak may be detected when a present measurement of the volume of water flow or change in the water pressure is uncharacteristic for the given day and time of day at a specific node. The present measurement is uncharacteristic if it deviates beyond a given threshold from a measurement stored by the user signature for the same day, time of day and node. In example embodiments, the leak may be detected based on comparing flow rates before and after a water consumption event has occurred, as shown in FIG. 4.

If a leak is detected at 204 (e.g., "YES" at 204), then method 200 proceeds to 205 and method 200 includes sending a notification/alert to a user electronic device (such as the user electronic device (113) shown in FIG. 1) indicating an overconsumption (e.g. overconsumption in the washing machine) and/or a potential leak. The notification/alert may be displayed an in-home display and/or user mobile device (via a mobile app, for example).

At 206, method 200 includes further verification to conclude that an actual leak has occurred. As an example, if a detected overconsumption persists for less than a preset length of time, then the method determines that the potential leak detected at 204 is not an actual leak, and method 200 proceeds to 209. At 209, a system override occurs, and the method returns to 203, to resume continuous calibration. However, if the overconsumption persists for longer than the preset length of time, then method 200 concludes that an actual leak has occurred, (e.g., "YES" at 206) then method proceeds to 207 where the user is alerted that an actual leak has been detected. Further, the user may be advised to shut off a main water valve (such as the main water valve (101) of FIG. 1, for example) or one or more valves associated with the leak. Once user shuts off the water valve, method 200 proceeds to 208, where continuous calibration is resumed. As such, the calibration is resumed after the leak is fixed and the water valve is turned back on.

In this way, the method monitors water usage and detects leaks based on any deviations or uncharacteristic changes in the water usage, and further alerts the user describing the deviation. This allows the user to self-monitor water usage and/or preemptively address a potential problem.

Figure 3:
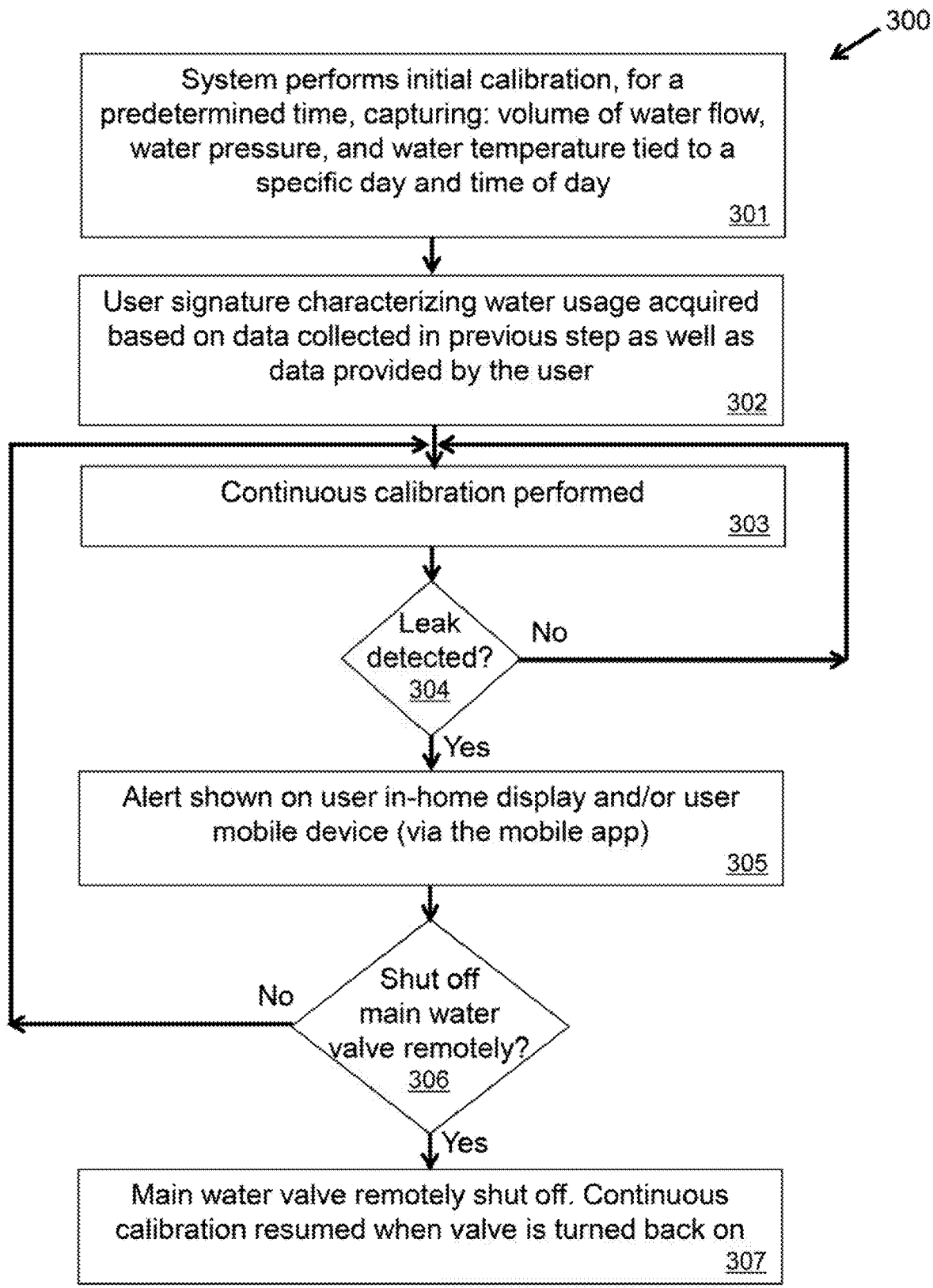
FIG. 3 is a flowchart detailing an exemplary process of leak detection for the present invention in Away Mode.

If the user has set the system in Away Mode, an example method 300 shown in FIG. 3 is performed to alert the user of potential leaks and further take mitigating actions as described below. Steps 301-304 of method 300 are similar to steps 201-204 of method 200. Briefly, at 301 of method 300, a collector unit ties a day and a time of day to water usage data measured by the water meter. At 302, the second set of data is used to create a user signature characterizing the water usage of a user. At 303, continuous calibration is performed. As mentioned earlier, continuous calibration allows for effective monitoring of water usage by the system after the initial calibration, and the first set of data may be continuously updated. At 304, method 300 determines if a leak has been detected. If no leak is detected (e.g., "NO" at 304), method 300 returns to 303 for continued monitoring and calibration. However, if a leak is detected ("e.g., "YES" at 304), then method 300 proceeds to 305. As described previously, a leak may be detected when a present measurement of the volume of water flow or change in the water pressure is uncharacteristic for the given day and time of day at a specific node. As such, the system treats any unplanned water usage as a leak, and when detected, an alert is sent to the user electronic device at 305. Next, at 306, method 300 checks if the main water valve can be turned off remotely. As an example, if a smoke detector system (such as smoke detector (121) of FIG. 1) is triggered, the method will not allow the main water valve to be shut-off remotely. Method 300 returns to 303 to perform continuous calibration.

However, if the valve can be turned off remotely (e.g., smoke detector system is not triggered), then method 300 proceeds to 307, where the main water valve is remotely shut off. In addition, continuous calibration is resumed when the valve is turned back on. In an alternative embodiment, the method may send an alert to the user electronic device indicating a leak has been detected and proceed to automatically shut off the main water valve, remotely, after a set time interval has passed with no response from the user. This time interval may be chosen and preset by the user.

In this way, the method continuously monitors and calibrates water usage, and detects leaks based on any usage pattern deviating from the user signature. In addition, the user is alerted describing the deviation. This allows the user to self-monitor water usage and/or preemptively address a potential problem. If the user has set the system to Away mode, the method preemptively shuts off the main water valve from remote location to reduce damage due to water leaks.

Additional System Features

In the leak monitoring system of the present invention, the mobile app is also leveraged to allow a user to select Home Mode or Away Mode. When the system is in home mode, "Over Consumption" notifications are sent so that the user can respond accordingly. When the user leaves home, the system may be set to "AWAY" mode. In this mode only planned events are allowed (e.g. lawn sprinklers). Any other flow of water in the home registers as a leak and a notification is sent to the user. The system also offers an auto shutoff option, where the valve associated with the detected leak is shut-off within a pre-specified time.

The system employs an ultrasonic sensor to accurately measure flow and send this information every minute to the system cloud for data analytics. Data from water meters (compatible with the present system) coupled to the home may also provide information to the system.

Additionally, the present system also employs temperature sensors to ensure water flow through pipes during periods of sustained low temperatures (e.g. below 10 degrees Fahrenheit) to prevent frozen pipes. Further, integration with a smoke detection system may ensure that the system does not shut off water to the user home when in the case of fire.

Figure 9:
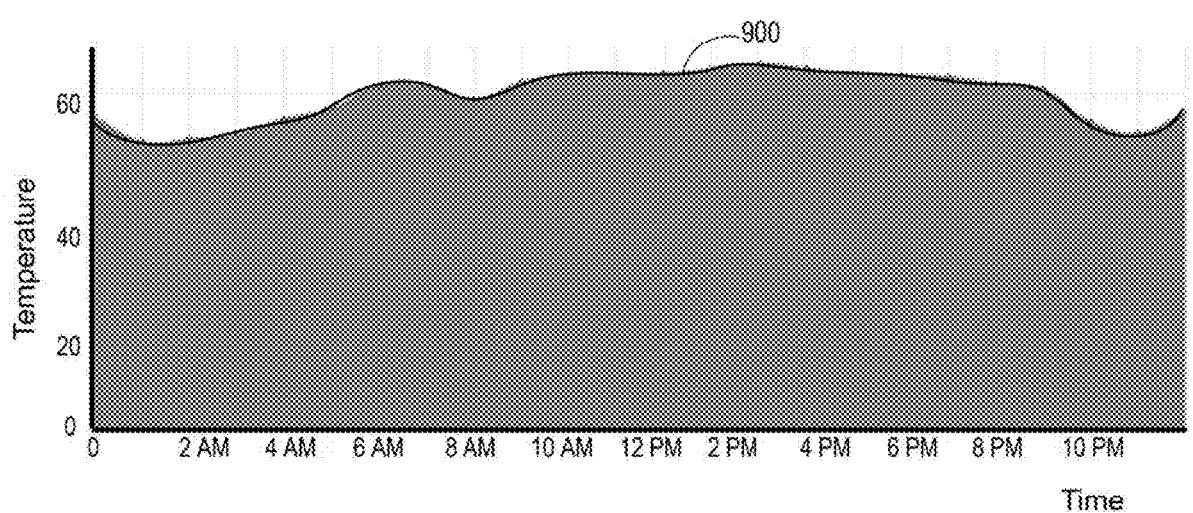
FIG. 9 is a non-limiting example of a temperature reading acquired by the system during the single day.

In another system mode, the VACATION-Winter mode, the user is asked to leave one or more faucets open in the home and shuts off the main line. When the temperature drops, the system opens the main valve and allows the water to flow, thus preventing the pipe from freezing. FIG. 9 shows an example temperature plot (900) when the system is the VACATION-Winter mode. Herein, the temperature is continuously recorded and monitored, and an average temperature is recorded. If the average temperature falls below 32° F., then the freeze protection program may be activated, as described previously.

Additionally, the system uses user input to tag specific water consumption events, for example, if a user takes a long shower the mobile app will ask the user to tag the shower event. The system will continuously learn specific consumption patterns over time and learn specific water usage in the home.

Figure 7:
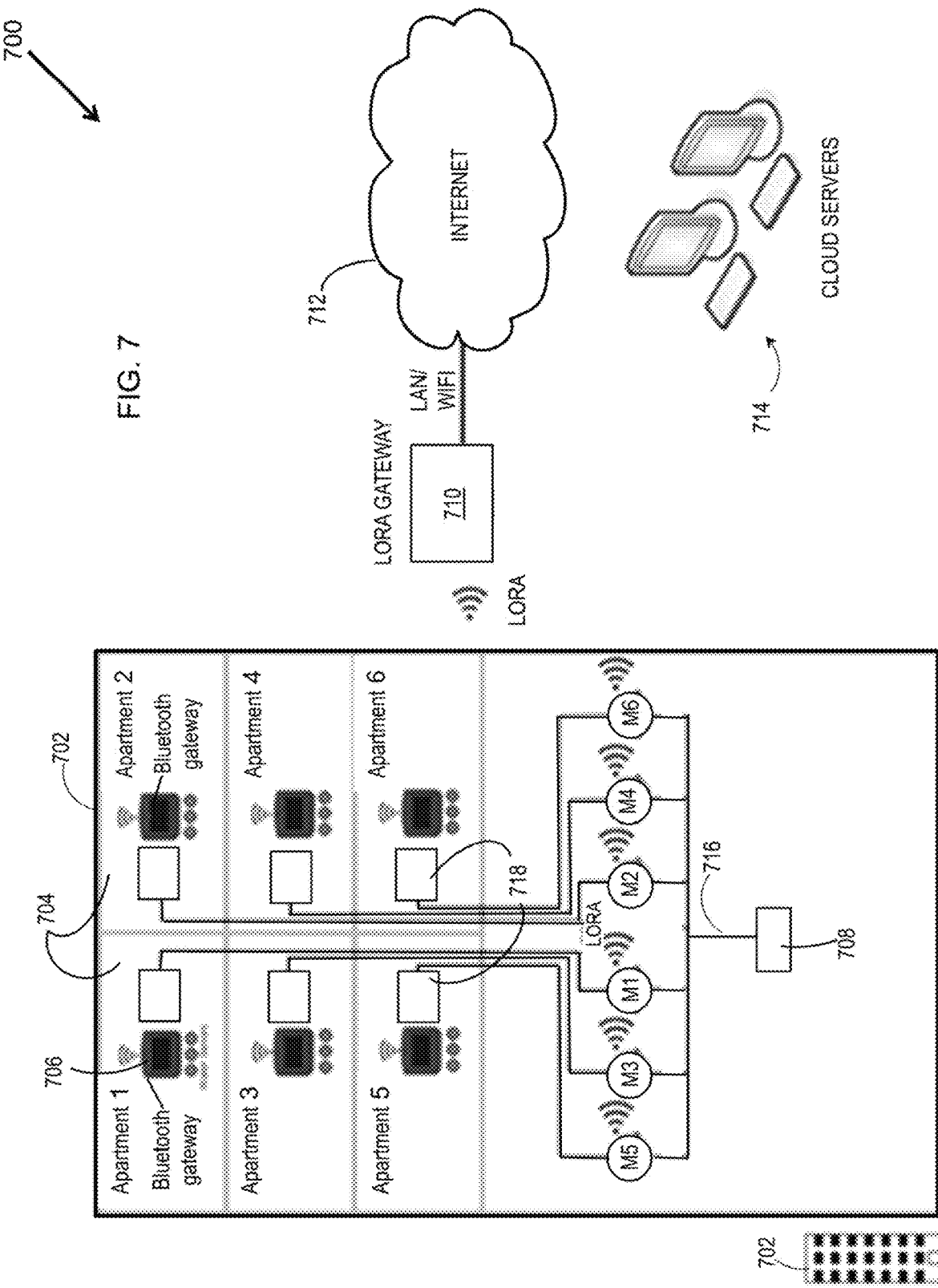
FIG. 7 shows a schematic diagram of a non-limiting embodiment of the present system.

The system also allows for a plurality of individual water meters to connect to a single data collector in either a wired or wireless configuration, as shown in FIG. 7. A schematic diagram (700) of FIG. 7 shows a building (702) having a plurality of apartments (704). A main water line meter (708) may couple a main water line (716) to the plurality of apartment (704) through a plurality of water meters. As a non-liming example, six apartments (apartments 1 through 6) are shown in diagram (700), each apartment includes a water meter ("M") configured to direct water into the apartments. The water meters additionally collect water usage data from each of the apartments, for example. Each apartment may include a plurality of sensors (718) configured to gather data. The data gathered by the sensors (718) may be transmitted to the respective water meter (M1-M6) through a Bluetooth gateway (706). As discussed previously, the plurality of sensors may include one or more of pressure sensors, temperature sensors, humidity sensors, water quality sensors, and the like. The data collected from each of the apartments may be transmitted through long range (LORA) wireless system (710) to a cloud (712). The water usage data from each of the apartment of the building is thus saved in the cloud, which may then be accessed by cloud servers (714). Analytics may be performed on the data retrieved from the cloud (712) by the cloud servers (714). Analytics may include generating a user signature for each apartment of the building. In one non-limiting example, the building set up with a plurality of water meters may be a smart building setup, and the plurality of meters may be managed by the cloud servers (also called central dashboard SAYA-One). SAYAOne is a single point of control for all installed meters in a building and can be used for billing, leak detection and isolation, freeze protection and analytics reporting. In an exemplary embodiment, an embedded valve and a shutoff actuator is employed. Other embodiments may cover external valves with shutoff systems.

As used herein, the term "about" refers to plus or minus 10% of the referenced number.

Various modifications of the invention, in addition to those described herein, will be apparent to those skilled in the art from the foregoing description. Such modifications are also intended to fall within the scope of the appended claims. Each reference cited in the present application is incorporated herein by reference in its entirety.

Although there has been shown and described the preferred embodiment of the present invention, it will be readily apparent to those skilled in the art that modifications may be made thereto which do not exceed the scope of the appended claims. Therefore, the scope of the invention is only to be limited by the following claims. Reference numbers recited in the claims are exemplary and for ease of review by the patent office only, and are not limiting in any way. In some embodiments, the figures presented in this patent application are drawn to scale, including the angles, ratios of dimensions, etc. In some embodiments, the figures are representative only and the claims are not limited by the dimensions of the figures. In some embodiments, descriptions of the inventions described herein using the phrase "comprising" includes embodiments that could be described as "consisting of", and as such the written description requirement for claiming one or more embodiments of the present invention using the phrase "consisting of" is met.

The reference numbers recited in the below claims are solely for ease of examination of this patent application, and are exemplary, and are not intended in any way to limit the scope of the claims to the particular features having the corresponding reference numbers in the drawings.

What is claimed is:

1. An integrated water management system, effective for metering water usage, detecting and stopping a water leak, and reusing grey water, the system comprising:
   a. a water meter (103) inline to a main water valve (101), wherein the water meter (103) is configured to provide water usage data to a collector unit (107);
   b. an irrigation controller (125) coupled to the collector unit, wherein said irrigation database (125) is configured to store weather data, city requirements for water use, and soil moisture levels from different regions as water consumption data and provide the water consumption data to the collector unit (107);
   c. a grey water management controller (127) wirelessly coupled to the collector unit, wherein said grey water management, database (127) is configured to store grey water redirection data to be provided to the collector unit (107);
   d. a system controller (136) comprising a memory (134) and a system processor (109) wirelessly coupled to the collector unit (107), wherein the memory stores instructions that, when executed by the system processor (109), causes the system processor (109) to perform operations comprising:
      i. generating a user signature based on the water usage data, the user signature characterizing the water usage of a user, wherein the system processor (109) detects a leak based on the user signature;
      ii. generating a water consumption plan based on the water consumption data to water a region having a lower than threshold water level; and
      iii. generating a grey water route plan based on the grey water redirection data to redirect grey water to zones that have a lower than threshold moisture levels;
   e. a remote database (111) wirelessly coupled to the system processor (109) for storing the user signature, the water consumption plan, and the grey water route plan;
   f. a valve actuator (105) operatively coupled to the main water valve (101), wherein the valve actuator (105) is configured to adjust the main water valve (101) based on one or more of the user signature, the water consumption plan, and the grey water route plan, wherein the valve actuator (105) is wirelessly coupled to the system processor (109); and
   g. a user electronic device (113) configured to access the system controller, wherein communication between the user electronic device (113) and the system processor (109) is accomplished via a telecommunication, network,
   wherein when the leak is detected, the system processor (109) notifies the user electronic device (113), wherein the user indicates to the system processor (109) via the user electronic device (113) whether or not to dose the main water valve, wherein the user may optionally shat off a, source of the leak manually or permit the system processor (109) to remotely shut off the main water valve via the valve actuator thereby stopping the leak,
   wherein when the region having lower than threshold water level is detected, the system processor (109) notifies the user of the region, via the user electronic device (113) to adjust the main water valve, via the valve actuator, to direct increased water flow to the region,
   wherein when zones having lower than, threshold moisture levels are detected, the system processor notifies the user of the zones via the user electronic device (113) to adjust the main water valve, via the valve actuator, to decrease incoming water and increase grey water, thereby reusing the grey water, reducing a demand for fresh dean water and reducing waste water.

2. The system of claim 1, further comprising
a smoke detector (121) coupled to the water meter (103) such that when the smoke detector (121) is activated by detecting smoke the valve actuator (105) does not close the main water valve (101) when a significant increase in the volume of water flow occurs, wherein the significant increase in the volume of water flow results from water used to put out a fire that initially triggered the smoke detector (121), thereby combating the fire; and
a contact sensor (123) operatively coupled to the collector unit (107), wherein the contact sensor (123) is configured to detect wet level around an appliance of a node, wherein if the region is wet then the contact sensor notifies the collector unit (107) via a signal, wherein the collector unit (107) notifies the system processor (109) to shut off a valve delivering water to the appliance via a second valve actuator, thereby reducing further leaks.

* * * * *